United States Patent
Vaughan et al.

[11] Patent Number: 6,054,113
[45] Date of Patent: Apr. 25, 2000

[54] METHOD FOR PREPARING HIGH SILICA FAUJACITIC ZEOLITES

[75] Inventors: David E. W. Vaughan, Flemington; Karl G. Strohmaier, Port Murray; Gary B. McVicker, Califon, all of N.J.; Owen C. Feeley, Baton Rouge, La.

[73] Assignee: Exxon Research and Engineering Co., Florida Park, N.J.

[21] Appl. No.: 09/040,154

[22] Filed: Mar. 17, 1998

Related U.S. Application Data

[60] Continuation-in-part of application No. 08/721,932, Sep. 27, 1996, abandoned, which is a division of application No. 08/524,357, Sep. 5, 1995, abandoned.

[51] Int. Cl.[7] .................................................. C01B 39/20
[52] U.S. Cl. ........................ 423/713; 423/714; 423/715; 423/DIG. 21; 502/79; 502/85; 502/86
[58] Field of Search ................................. 423/713, 714, 423/715, DIG. 21; 502/79, 85, 86

[56] References Cited

U.S. PATENT DOCUMENTS

| | | |
|---|---|---|
| 3,493,519 | 2/1970 | Kerr et al. ............................ 423/713 |
| 3,506,400 | 4/1970 | Eberly, Jr. et al. . |
| 3,972,983 | 8/1976 | Ciric . |
| 4,840,930 | 6/1989 | LaPierre et al. ......................... 502/79 |
| 5,013,699 | 5/1991 | Vassilakis et al. ..................... 502/79 |
| 5,019,543 | 5/1991 | Davis et al. ............................ 502/79 |
| 5,116,590 | 5/1992 | Vaughan et al. ....................... 502/79 |
| 5,139,984 | 8/1992 | Iwamato et al. ....................... 502/79 |
| 5,354,452 | 10/1994 | Dai et al. . |

OTHER PUBLICATIONS

Meier et al., Atlas of Zeolite Structure Types, Third Edition, pp. 88–89; 96–97, 1992.

*Primary Examiner*—C. Melissa Koslow
*Assistant Examiner*—David Sample
*Attorney, Agent, or Firm*—Henry E. Naylor

[57] ABSTRACT

A method for preparing novel zeolitic catalyst compositions having a high Si/Al ratio and a crystallinity of at least about 70%. The method involves cation exchanging an as synthesized faujasite material having an Si/Al greater than about 4 with a component selected from the group consisting of ammonium ions and mineral acids, then steam calcining said cation exchanged faujasite in a single steam calcination step at a temperature from about 900° F. to about 1 500° F.

14 Claims, 2 Drawing Sheets

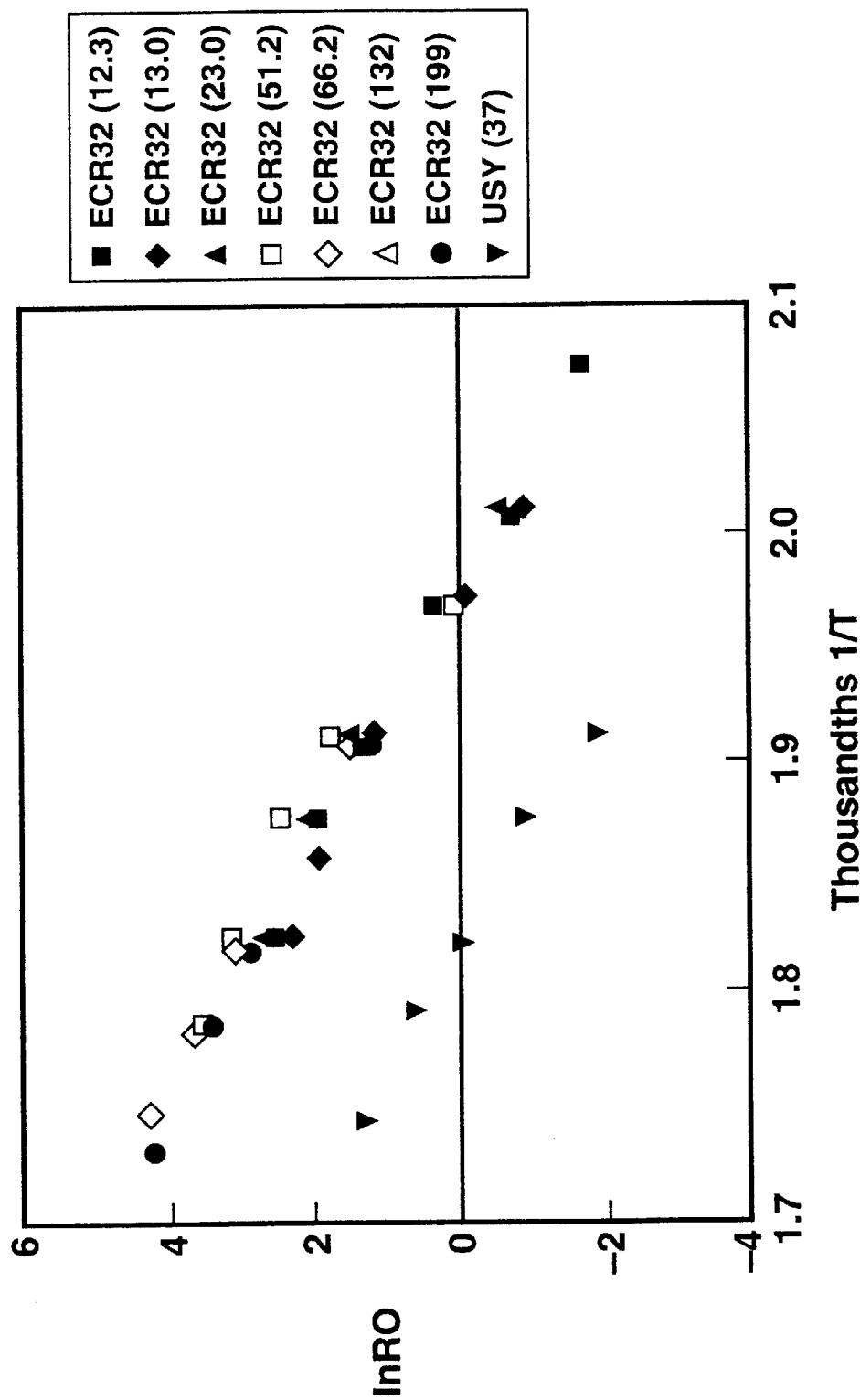

METHOD FOR PREPARING HIGH SILICA FAUJACITIC ZEOLITES

CROSS REFERENCE TO RELATED APPLICATIONS

This is a continuation-in-part of U.S. Ser. No. 08/721,932 filed Sep. 27, 1996 which is a division of U.S. Ser. No. 08/524,357 filed Sep. 5, 1995 now abandoned.

FIELD OF THE INVENTION

The present invention relates to a method for preparing novel high silica zeolitic catalyst compositions having a high Si/Al ratio and a crystallinity of at least about 70%. The method involves cation exchanging an as synthesized faujasite material having an Si/Al greater than about 4 with a component selected from the group consisting of ammonium ions and mineral acids, then steam calcining said cation exchanged faujasite in a single steam calcination step at a temperature from about 900° F. to about 1500° F.

BACKGROUND OF THE INVENTION

High silica zeolites are extensively used as catalysts, sorbents, ion-exchangers, separation media and pollution control agents in the petroleum, chemical and process industries. Although some commercially important zeolites, such as ZSM-5 and beta, can be directly synthesized in high silica forms (i.e. Si/Al>10), others, such as Linde-A and faujasite materials, must be prepared by first making a lower Si/Al ratio version then dealuminating them to form the high silica analog. Many such dealumination methods are known in the art and are generally referred to as "secondary synthesis". The term "secondary synthesis" refers to the process of changing the zeolite framework composition by chemically reacting various cation exchanged forms of the "as synthesized" zeolite (or mineral form) with a variety of reagents. An early dealumination process taught acid treatments of the mineral clinoptilolite (Barrer and Makki, Canad.J. Chem., 42, p.1481, (1964)), the process had its major impact with the discovery that steam treatments of Na, $NH_4$-Y produced enhanced stability materials (U.S. Pat. No. 3,293,192). The latter, called "ultra-stable Y" (US-Y), have been a major research subject since the late 1960's. These processes, and their applications, have recently been reviewed by Scherzer in several publications (e.g. Amer. Chem. Soc. Symp. Ser. 248, p. 157–200 (1984): Catal. Rev. Sci. Engrg., 31(3), p.215–354 (1989)). Examples of such processes include steaming, as described in U.S. Pat. No. 3,293,192; acid leaching, as described in U.S. Pat. No. 3,506,400; the use of complexing reagents (e.g. EDTA), as described in U.S. Pat. No. 4,093,560; the use of $SiCl_4$ vapor, as described in Beyer and Balenkaya, (in "Catalysis by Zeolites", Stud. Surf. Sc. Catal. v.5, p. 203, (1980), Elsevier)); and the use of $SiCl_4$ in non-aqueous solvents, as described in WO 88/01254; and the use of $CHF_3$ as described in U.S. Pat. No. 4,275,046. The resulting products are often called 'ultra stable' faujasites because of their enhanced thermal and hydrothermal stability. Finally, another technique for increasing the Si:Al ratio is the use of an aqueous solution of $(NH_4)_2SiF_6$, as described in U.S. Pat. No. 4,503,023. All of the above are non-limiting examples of conventional methods of "secondary synthesis" for the dealumination of zeolite materials.

Such methods, used in a multiple repetitive mode, have been used to make a near pure silica form of faujasite (Scherzer, J. Catal., vol. 54, p. 285 (1978)). However, there are significant differences in the catalytic properties of ostensibly similar materials. Clearly different routes to the same composition produce microscopically different products as demonstrated in many publications (e.g. Dwyer et al, Chem.Commun., p.422 (1981); Stud. Surf. Sci. Catalysis, vol. 69, pp. 1–24, (1991)), whether they are obtained by progressive de-alumination, or re-alumination of de-aluminated materials. Variations in secondary mesopores (both in pore volume and pore diameter distributions) and Al distributions (speciation and heterogeneous distribution within or on the zeolite crystals) are difficult to control in all of these processes. Generally, the more processing needed to achieve a target composition the lower its yield (i.e. material is dissolved away) of the crystalline product and the greater the amount of its amorphous component in the product.

We recognise that there may be some catalytic advantages to a degraded zeolite material containing large mesopores (>10 nm), particularly in the conversion of wide composition range "heavy" or "resid" feedstocks containing large multi-ring aromatic molecules and high heteroatom (S, N) contents, as converted in fluid catalytic cracking. However, the products of the present invention are targeted at more selective processing and have more controlled and selective properties, have low yield losses, require less processing to achieve target properties and therefore produce fewer waste products and polluting effluents.

Therefore, there is a need in the art for processes for producing faujasitic zeolitic materials in high yield, having relatively high Si/Al ratios, as well as the resulting high silica zeolite materials themselves.

SUMMARY OF THE INVENTION

In accordance with the present invention, there is provided a method for preparing a faujasite zeolite composition having the formula expressed as the mole ratio of oxides as:

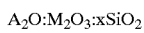

$$A_2O:M_2O_3:xSiO_2$$

wherein M is a metal selected from Al, Ga, Fe, Cr, Zn, B, and P; A is a cation from Groups I through VIII of the Periodic Table of the Elements and x is between 16 and infinity, which method consists essentially of:

cation exchanging an as synthesized faujasite material having an Si/Al greater than about 4 with a component selected from the group consisting of ammonium ions and mineral acids;

steam calcining said cation exchanged faujasite in a single steam calcination step at a temperature from about 900° F. to about 1500° F.; and extracting at least a portion of said metal in a single extraction step.

In preferred embodiments of the present invention, the secondary synthesis comprises ammonium exchanging a said faujasitic composition to remove the alkali metal (Na) steam calcining the ammonium exchanged composition between a temperature between about 482° C. and 815° C., followed by removal of said metal by leaching to the desired composition. Ammonium exchange can optionally be substituted by a mild acid exchange, such as a dilute mineral acid.

In other preferred embodiments of the present invention the faujasitic material is primarily selected from the group consisting of ECR-4, ECR-30, ECR-35, and ZSM-32.

In still another preferred embodiment of the present invention, the product Si/Al is between about 40 and 300.

In yet another preferred embodiment of the present invention about 0.01 wt. % to about 10 wt. % of a metal from Group VIII of the Periodic Table of the Elements is present on the metal high silica composition, which weight percents are based on the total weight of the metal silicate composition plus Group VIII metal.

BRIEF DESCRIPTION OF THE FIGURES

FIG. 2 is a plot of MCH ring opening activity versus reciprocal temperature of the products of Example 7 hereof

DETAILED DESCRIPTION OF THE INVENTION

Figure 1:
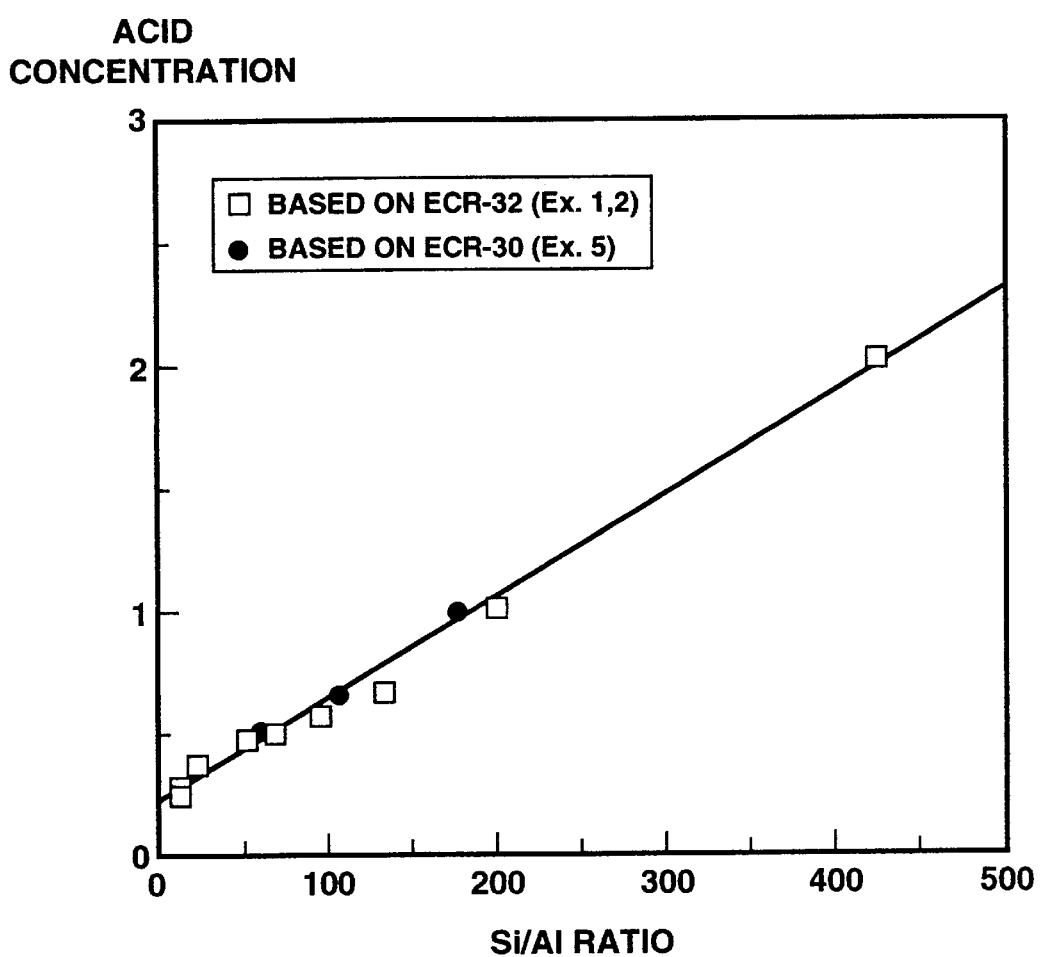
FIG. 1 is a plot of acid concentrations for the HCl acid exchange/extraction step used to prepare the high silica faujasitic zeolites of Examples 1 and 2 hereof.

We have discovered that if one starts with a zeolite material of the ECR-4 type having an Si/Al ratio greater than about 4, rather than with a Y-type material, superior zeolite products will result having crystallinities of at least 70%. (It is to be understood that crystallinity is measured using ASTM method D3906 which uses a high quality, fully crystallized Y faujasite as the reference standard.) The process of the present invention will result in enhancement in the control of product material properties and yield, a simplification in the process variables, and overall lower pollution process. Particularly important is that one can obtain a range of compositions using a single steam calcination step followed by a single extraction step, thereby attaining compositions ony achievable in the prior art with significantly more steps. We have found that procedures of the present invention are applicable to the whole family of faujasitic zeolitic materials, with the provision that the starting material is initially synthesized with the Si/M ratio greater than 4.

Because the secondary synthesis process is one that inherently degrades the zeolite structure, an objective of the present invention was to discover a preferred initial composition that could tolerate the removal of framework "T-atoms", without significant crystal structure collapse. If the base zeolite has less than about 20% of its framework sites occupied by $Al^{3+}$, they can be effectively titrated out by the process of the present invention. It is to be understood that, while the term "Si/Al" is used, the more general term "Si/M" may also be used wherein M is preferably Al, Ga, B, Zn, P, Fe, or Cr, and mixtures thereof. Al is of course the most preferred metal. Such a process of $Al^{3+}$ removal readily facilitates the "tuning" of the acidity of the product zeolite, with unprecedented manipulation of acidic catalyst properties. Such materials are exceptional supports in bi-functional catalytic systems with the metals of Group VIII of the Periodic Table of the Elements providing the second catalytic function. The amount of Group VIII metal will range from about 0.01 to 10 wt. %, preferably about 0.01 to 3 wt. %, and more preferably 0.1 to 1.5 wt. %, based on the total weight of the catalyst. It is to be understood that the preferred Group VIII metals are the noble metals; more preferably Ir, Ru, Pt, and Pd; most preferably Ir and Ru.

Selection of the initial zeolite composition is important in that it must have the survivability criterion set out above. Suitable compositions for use herein include those comprising structures characteristic of faujasite, "Breck-6" (ECR-30) and mixtures thereof. Such end members and their mixtures have been reviewed in U.S. Pat. No. 5,116,590, and include those designated ECR-4 (U.S. Pat. No. 4,714,601), ECR-30 (U.S. Pat. No. 4,879,103), ECR-32 (U.S. Pat. No. 4,931,267), ECR-35 (U.S. Pat. No. 5,116,590), ZSM-3 (U.S. Pat. No. 3,415,736), ZSM-20 (U.S. Pat. No. 3,972,983) and variously named analogs of these, such as EMT-1, EMT-2, "hexagonal faujasite" and others. The faujasite and "Breck-6" end-members of this group have been assigned structure codes FAU and EMT. ("Atlas of Zeolite Structure Types", 3rd Ed., Meier et al.). Various other higher silica modifications of the faujasite structure may be found in the literature. For example, U.S. Pat. No. 4,309,313, describes CSZ-1 as being made with cesium cations and having an X-ray diffraction pattern indexed on a hexagonal unit cell similar to that proposed for "Breck 6". However, it has recently been shown that CSZ-1 is made of a slightly distorted faujasite structure of twin planes near the center of very thin crystals. (Treacy et al, *Jour. Chem. Soc. Chem. Commun.*, p. 1211 (1986)). The twin planes create a strain in the faujasite lattice which causes a rhombohedral distortion in the cubic lattice structure of the faujasite. See Treacy et al., *Analytical Electron Microscopy,* San Francisco Press, p. 161–5, (1987). A faujasite crystal with individual double twin planes has also been observed by Thomas et al. reported in the *Jour. Chem. Soc. Chem. Commun.,* (1981), p. 1221). Another faujasite-like material, ZSM-3, made with lithium and sodium, is described in U.S. Pat. No. 3,415,736. Although, having a hexagonal-like unit cell, similar to that of CSZ-1, the "c" axis of the diffraction plane for ZSM-3 could not be defined. See Kokotailo and Ciric, *Molecular Sieve Zeolites-*1. Amer. Chem. Soc. Adv. Chem. Ser. 101, Ed. Flanigen and Sand., p. 109 (1971). Therefore, ZSM-3 was believed to be made of a random stacking of faujasite and ECR-30, which means that the structure is a random mixture of the cp and hp forms. An infrared analysis of ZSM-3 later showed that it is more disordered than ZSM-20 described in U.S. Pat. No. 3,972,983. See Vaughan et al., *Amer. Chem. Soc. Symp. Ser.* 398, p. 544, (1989). A recent evaluation of ZSM-20 by Derouane et al., in *Applied Catal.,* Vol. 28, p. 285 (1986) and by Ernst et al. in *Zeolites,* Vol. 7, p. 180 (1987) describes ZSM-20 as a faujasite-like material having spherical aggregates of twinned chunky crystals and a unit cell capable of being indexed on a hexagonal unit cell. Newsam et al, in *Jour. Chem. Soc. Chem. Commun.,* p. 493, (1989) reported that ZSM-20 was an intimate intergrowth mixture of cp and hp layers with significant amounts of overgrown faujasite crystals. These numerous intergrown materials are all suitable base materials for preparing the novel faujasitic materials, providing that they have Si/Al ratios higher than about 4. Treacy et al. (Proc. Roy. Soc., vol. 252A, pp. 813–40, (1996)) have reviewed the relation ships in this whole family of materials. However, it is important to note that only ECR-4, ECR-30, ECR-32 and ECR-35 are readily and reproducibly made with Si/M ratios greater than 4.

The novel high silica controlled acidity faujasitic compositions of the present invention have higher retained crystal structure and lower meso- and macro-porosity than conventional faujasite materials. They offer a greatly improved method for controlling the acidities of high silica faujasites which presently dominate FCC and hydroprocessing. They will also have enhanced regeneration stability in FCC, specific hydroprocessing advantages based on higher retained crystallinity and super-microporosity, and unusual molecular separation properties based on their hydrophobicity. These faujasitic materials can be suitable bound with inorganic oxide or inert clay components so as to form usable fabrications. Such methods and components are well known in the art.

These high capacity high silica faujasites of the present invention; in addition to being excellent supports for catalytic metals, and therefore useful in hydrocracking, hydroisomerization and reforming, should also have wide application as: (i) hydrophobic sorbents for pollution control—removal of organics from water; (ii) control of volatile organic chemicals under high humidity conditions which render conventional zeolites non-selective; and (iii) selective separations of less polar materials (e.g. trace hydrocarbon removal from such streams as BTX-streams).

When starting with directly synthesized faujasites having Si/Al ratios greater than about 4, the resultant products and processes have the following advantages when compared to conventional starting materials.
1) A high level of dealumination control, and therefore acidity control.
2) High product crystallinity, high hexane capacity and microporosity in small micropores.
3) Unit cells less than 24.5 Å.
4) Moderate not high mesoporosities with mesopores primarily less than 8 nm.
5) High product yields.
6) Lower ammonium pollution from the process.

While recognizing that the post-stream dealumination may be carried out with a variety of reagents well known in the art (particularly various organic complexing agents such as EDTA, oxalates, acetates, etc.), pollution control regulations and the need to reduce the costs of effluent treatments direct the processing towards relatively benign mineral acids such as HCl.

The high Si to Al faujasitic materials of the present invention are prepared by starting with an "as synthesized" faujasitic material having an Si/Al ratio of about 4, the template is purged from the starting structure, a portion of the alkali synthesis cations are removed by cation exchange with ammonium ions or a mineral acid, then the material is steamed/calcined at a temperature between 900° F. and 1600° F. The Al is then extracted from the material using any suitable conventional dealuminating method. It is not necessary to slowly bring the materials of the instant invention to calcination temperatures as is required during the preparation of zeolites of LaPierre et al. in U.S. Pat. No. 4,840,930. It is critical that the zeolites of LaPierre et al. be brought to calcination temperatures by a first heating stage wherein the zeolites are slowly heated (less than about 2.5° C. per minute) until all of the chemically bound water is driven off, otherwise the structure of the zeolites will collapse. This is not required in the preparation of the instant zeolite materials because the "as synthesized" starting faujasitic material having an Si/Al ratio is more stable than the materials used by LaPierre et al. and thus can take much severe temperature treatments. Thus, the zeolitic materials of the present invention can be heated to calcination temperatures (900° F. to 1600° F.) at rates of greater than 3° C. per minute, preferably greater than 5° C. per minute. It is within the scope of this invention that the zeolitic materials of the present invention be placed in the calcination zone at calcination temperatures without slowly ramping the temperature to calcination temperatures, or even to some temperature below calcination temperatures to drive off chemically bound water. In fact, is may even be preferred to introduce the zeolite materials of the present invention directly into the calcination zone from a commercial point of view because it would be more cost efficient.

A preferred mode of this invention is to maximize the initial Si/Al ratio of the starting material by using a faujasitic material such as ECR-4, ECR-32, ECR-30 or ECR 35, having an Si/Al ratio greater than about 5 instead of about 4, and to control the final Si/Al ratio of the product only by the concentration of mineral acid used in the final washing or extraction step. Not only does this minimize unit processing (therefore maximizing product yield), but it eliminates the need to excessively ammonium exchange the material, thus avoiding a potential effluent pollution problem. The stability of these starting materials is such that they are relatively insensitive to steaming and other process conditions, as demonstrated in the examples showing effective dealumination even after short steaming times. Demonstrated by the "shock" steam treatments of these examples, it is clear that the "as synthesized" high silica faujasite varieties are highly robust materials that do not require slow, careful and controlled heating regimens. Regardless of the conditions, the final Si/Al ratio can be controlled with a single acid treatment. (While it is recognized that multiple staged treatments can also progressively reduce Si/Al ratios, such treatment are redundant if the target product can be obtained with a single treatment using a higher acid concentration.)

Acidity is controlled in the novel zeolite materials of the present invention by control of Si/Al ratios. This is important for those catalysts in which acidity is a factor. Combined with a metal function, such catalysts become a new family of bi-functional catalysts useful in a wide range of hydrocarbon conversion processes, including major refining operations such as hydrocracking, alkylation, transalkylation, hydroisomerization and reforming. Particularly useful in these applications are the metals of Group VIII of the Periodic Table, preferably the noble metals, more preferably Ir and Ru, and most preferably Ir. A preferred use for such materials is their use as catalyst for the isomerization /ring opening of compounds containing at least one $C_6$ ring. Preferred feeds containing such compounds include petroleum distillate feeds. These materials are claimed in a ring-opening process in U.S. Ser. No. 08/523,299, filed Sep. 5, 1995.

The following examples are presented to illustrate the present invention and not to be taken as limiting the scope of the invention in any way.

EXAMPLE 1

A sample of ECR-32 was made using tetrapropylammonium hydroxide (TPAOH) template in a gel stoichiometry of:

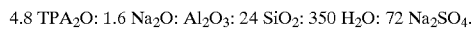

4.8 TPA$_2$O: 1.6 Na$_2$O: Al$_2$O$_3$: 24 SiO$_2$: 350 H$_2$O: 72 Na$_2$SO$_4$.

A sodium aluminate solution was prepared by dissolving 59 g. NaOH in 100 ml. distilled water. To this solution 75 g. of aluminum trihydrate(Al-$_2$O$_3$.3H$_2$O; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 250 g.

To a 3 liter plastic beaker were added, while mixing with a spatula, 674 g. of 40% colloidal silica (HS-40, dupont Ludox; 40 wt. % SiO$_2$), 137.2 g. nucleant seeds(U.S. Pat. No. 4,931,267)), 984.2 g. of aq. 40% TPAOH, 69.1 g.sodium aluminate solution as made above, 62.9 g. of 50% Al$_2$(SO$_4$)$_3$.17H$_2$O solution, and enough distilled water to bring the total weight of mixture to 2000 g. The white gel was transferred to a blender and thoroughly homogenized. The gel was then placed in two 1000 ml. Teflon bottles and reacted in an air oven at 100° C. for 9 days. The product was filtered and washed with distilled water. Powder X-ray diffraction showed the product to be pure ECR-32. This product was first calcined at 620° C. for 3 hours in air to remove the TPA template, then twice ammonium exchanged (using a standard method, vis: 1 part wt. ECR-32: 1 part wt. ammonium chloride: 10 parts wt. water), calcined at 350° C. for three hours, then re-ammonium exchanged twice again. The resulting material had an Si/Al=5.7, a unit cell of 24.46 Å, a crystallinity of 106% (compared to a standard NaY) and a hexane sorption capacity of 20.6 wt. %.

The material was then steam—calcined in a tube furnace for 5 hours at 675° C. (1250° F.), (samples were placed in the furnace after the temperature reached 675° C.) thereby resulting in a unit cell size of 24.28 Å and a crystallinity 98%. 5 gm portions of this steamed material were then acid exchanged with dilute hydrochloric acid solutions of different concentrations—0.25N, 0.5N, 1N and 2N (Samples A to D respectively of Table 1 below). The products were filtered and washed chloride free, then analyzed to give the results shown in Table 1 below.

A plot of acid concentration treatment against product Si/Al ratio gives a linear correlation (FIG. 1) indicative of an ability to tailor the properties of the final product by a simple single-post steam, acid treatment. Crucial to the success of the method is the choice of the starting ECR-4/32 material of sufficiently high Si/Al ratio to survive the process.

EXAMPLE 2

A second batch of the ECR-32 material of Example 1 was ammonium exchanged as described in Example 1 and steamed as a large batch in a pre-heated large box steam oven for 5 hours at 675° C. 5 gm samples were then acid treated in a manner described in Example 1, except that the acid concentrations were different. These samples are Samples E to I in Table 1 below. These data are also plotted in FIG. 1 and confirm the reproducibility of tailoring the Si/Al ratio to desired values by control of the acid concentration.

TABLE 1

|  | Acid conc. | % cryst. | Si/Al | Unit Cell | n-hexane |
| --- | --- | --- | --- | --- | --- |
| Sample A | 0.25N | 97 | 12.3 | 24.30X | 19.9% |
| Sample E | 0.28N | 99 | 13.0 | 24.30Å | 19.7% |
| Sample F | 0.38N | 101 | 23.0 | 24.30Å | 19.6% |
| Sample G | 0.47N | 105 | 51.2 | 24.30Å | 19.8% |
| Sample B | 0.50N | 103 | 66.2 | 24.30Å | 20.4% |
| Sample H | 0.57N | 98 | 94.5 | 24.29Å | 20.0% |
| Sample I | 0.66N | 104 | 132 | 24.29Å | 20.1% |
| Sample C | 1.0N | 96 | 199 | 24.27Å | 20.4% |
| Sample D | 2.0N | 98 | 423 | 24.26Å | 19.5% |

EXAMPLE 3

This example shows that high silica ECR-4/32 starting materials, because they are much more stable to variable steam temperatures, are insensitive to variable process conditions, as shown by this example. A sample of ECR-32 made in Example 1, after ammonium exchange, was subjected to a more severe steaming temperature of 760° C. (1400° F.) for 5 hours. The product had a crystallinity of 97% and a unit cell value of 24.28 Å, compared with the Example 1 sample, prior to severe steaming which had with a crystallinity of 98% and a unit cell value of 24.28 Å.

EXAMPLE 4

The steam stabilities of a series of different Si/Al starting materials are compared to demonstrate the preference for the high silica ECR-4/32 starting materials for making low aluminum products. A commercial NaY (crystallinity=100%; unit cell=24.68 Å; Si/Al) was compared with a series of TPA ECR-4/32 materials. All samples were ammonium exchanged in the manner described in Example 2 above, except that the NaY had no template and was therefore not calcined at 350° C. before exchange. The product properties are shown in Table 2 below. A plot of the number of # Al atoms in the framework versus the final retained crystal structure (% crystallinity) gives a linear relationship, thereby demonstrating the improved stability for ECR-4/32 materials. In the most extreme steam conditions, starting Si/Al ratios greater than about 4.0 is needed to obtain products having more than 70% retained crystallinity. This data shows that to retain the highest crystallinity after steaming it is necessary to maximize the initial Si/Al ratio greater than 4. Si/Al>4.5 is preferred, and greater than 5 is most preferred.

TABLE 2

| Starting material Properties | | | Product Properties |
| --- | --- | --- | --- |
| Material | Si/Al | # Al/Unit Cell | crystallinity |
| NaY | 2.50 | 59 | 19% |
| ECR-32 | 3.40 | 44 | 59% |
| ECR-32 | 4.17 | 37 | 79% |
| ECR-32 | 5.10 | 31 | 97% |

EXAMPLE 5

A sample of ECR-30 (Breck-6 structure) was made using triethylmethylammonium (TEM) hydroxide in a gel stoichiometry of:

$$6 \text{ (Et}_3\text{MeN)}_2\text{O}: 2.6 \text{ Na}_2\text{O}: \text{Al}_2\text{O}_3: 40 \text{ SiO}_2: 425 \text{ H}_2\text{O}: .06 \text{ Na}_2\text{SO}_4,$$

using the method described in U.S. Pat. No. 4,879,103 (Example 4). The gel was reacted in Teflon bottles in an air oven at 100° C. for 17 days. The product was filtered and washed with distilled water. Powder X-ray diffraction showed the product to be pure ECR-30, and chemical analysis gave an Si/Al of 4.5. The product was first calcined at 620° C. 1148° F.) for 3 hours in air to remove the triethylmethylammonium (TEM) template, then twice ammonium exchanged, calcined at 350° C. (662° F.) for three hours, then re-exchanged and calcined twice again. It was then steam—calcined in a tube furnace set at 675° C. (1250° F.) for 5 hours. 10 gm portions of this steamed material were then acid treated in 150 mls of refluxing, dilute hydrochloric acid solutions of different concentrations—0.5N, 0.65N and 1N—for three hours. The products were filtered and washed chloride free, then analyzed to give the results shown in Table 3 below. These are plotted in FIG. 1, showing the same de-alumination characteristics as the ECR-32 based materials, indicating a common mechanism.

TABLE 3

|  | Acid conc. | Si/Al | n-hexane |
| --- | --- | --- | --- |
| Sample A | 0.5N | 59.7 | 19.2% |
| Sample B | 0.65N | 104 | 19.2% |
| Sample C | 1.0N | 175 | 18.9% |

This demonstrates that the end members of the faujasite family behave identically with respect to the treatment of the present invention. Therefore, it is anticipated that the other members of the family will similarly behave.

EXAMPLE 6

A sample of GaECR-32 was made using tetrapropylammonium hydroxide in a gel stoichiometry of:

4.8 TPA$_2$O: 1.6 Na$_2$O: (.05Al..95Ga)$_2$O$_3$: 24 SiO$_2$: 350 H$_2$O: .49 Na$_2$SO$_4$.

A sodium gallate solution was prepared by dissolving 24.8 g. NaOH in 60 ml. distilled water. To this solution 28 g. of gallium oxide was added and the solution was heated with stirring on a hot plate/magnetic stirrer to a mild boil until the Ga$_2$O$_3$ dissolved. The solution was then cooled to room temperature and distilled water added to a final weight of 123.1 g. To a plastic beaker were added, while mixing with a spatula, 352.3 g. of 40% colloidal silica (HS-40, duPont Ludox; 40 wt. % SiO$_2$), 32.6 g. nucleant seeds (Example 1), 489.8 g. of aq. 40% TPAOH, 57.9 g.sodium gallate solution as made above, 10.1 g. of 48% H$_2$SO$_4$ solution, and enough distilled water to bring the total weight of mixture to 1000 g. The white gel was transferred to a blender and thoroughly homogenized. The gel was then placed in 1000 ml. Teflon bottles and reacted in an air oven at 100° C. for 8 days. The product was filtered and washed with distilled water. Powder X-ray diffraction showed the product to be pure ECR-32. This product was first calcined at 620° C. for 3 hours in air to remove the TPA template, then twice ammonium exchanged, calcined at 350° C. for three hours, then re-exchanged and calcined twice again. This material had a Si/(Ga+Al) of 4.88, a unit cell of 24.522 Å, a crystallinity of 89% (compared to a standard aluminum NaY—Ga absorbs X-rays more strongly than Al, so reducing the peak intensities) and a hexane sorption capacity of 19.1 wt. %. It was then steam—calcined in a tube furnace for 5 hours at 675° C. (1250° F.), after which treatment the unit cell was 24.255 Å. A 2.5 gm portion of this steamed material was then acid treated in 37.5 mls 1N dilute hydrochloric acid for three hours. The product was filtered and washed chloride free, then analyzed to give a product having a Si/Ga ratio of 367, an unit cell of 24.271 Å, a crystallinity of 83% compared to the starting material and a n-hexane sorption capacity of 20.6 wt. %.

EXAMPLE 7

The materials of Examples 1 and 2 were loaded utilizing the incipient wetness technique with an aqueous solution of chloroiridic acid to give a loading of 0.9 weight percent iridium metal. In addition, a commercially available sample of a dealuminated US-Y material was also loaded identically. For example, 48.7 g of dried ECR-32 of a Si/Al ratio of 66.2, was immediately mixed with 29.2 ml of an aqueous chloroiridic acid solution containing 0.442 g of iridium. The impregnated material was then put in an oven at 1 20° C. to dry overnight. The impregnated, dried material was then calcined in air in a muffle furnace where the temperature was ramped at 1° C./min from room temperature to the final calcination temperature of 270° C. All other samples were proportionally treated in the same manner.

The reaction was carried out in a 25 cm$^3$ stainless steel fixed-bed, downflow reactor capable of pressures to 500 psig and temperatures to 550° C. The reactor was charged with 0.5 g of catalyst with the remainder of the reactor volume filled with inert material. The catalysts were reduced in flowing hydrogen gas, 500 cc/min, under a pressure of 400 psig while increasing the reactor temperature from ambient temperature to 500° C. Following reduction, the temperature was lowered to the initial reaction temperature, e.g. 200° C., and the hydrogen flow reduced to 315 cc/min. The reactant, methylcyclohexane (MCH), was fed to the reactor utilizing liquid feed pumps at the rate of 20 cc/hr. After steady-state conversions were achieved, typically within one hour, the reaction temperature was successively increased at 10–25° C. intervals. In several cases the reaction was returned to an intermediate temperature to verify if any deactivation had occurred. The total reactor effluent was analyzed by in line GC. All products were verified by GC/MS analysis. Table 4 shows the results of the testing at a reaction temperature of 260° C. over these materials. The data gives the total rate of reaction as well as the rates of formation of cracking products, i.e. methane to hexanes, ring opening products, and ring contraction, i.e. conversion of cyclohexyl ring to cyclopentyl ring, products. Also given is the selectivity of the ring opening reaction. FIG. 2 is an Arrhenius plot of the natural logarithm of the rate of formation of ring opening products versus reciprocal absolute temperature. Table 4 and FIG. 2 illustrate the significantly enhanced ring opening rates for iridium supported on the materials of Examples 1 and 2 relative to iridium supported on the commercially available USY having an Si/Al ratio of 37.

If we compare samples F and G with the USY, all identically prepared apart from the use of methods of this invention, although the USY is expected to have comparable activity and selectivity, if Si/Al and unit cell values are the important variable, it is clearly highly inferior. The materials of this invention have clearly superior activity and selectivity for the subject reactions which are characteristic of hydrogenolysis and hydrocracking as shown by the "ring contraction" and "ring opening" data columns in Table 4. These data further show the activity/selectivity control over a range of compositions and the "tailoring" possibilities for this family of materials.

TABLE 4

| | Methylcyclohexane Reaction Rates (mole/hr/kg catalyst)[a] | | | | | |
|---|---|---|---|---|---|---|
| 0.9 wt. % Ir Catalysts (Si/Al ratio) | % Conv | C1–C$_6$[b] | Ring Opening[c] | Ring Contraction[d] | TOTAL | % Ring Opening |
| ECR-32 (12.3) | 20.0 | 0.9 | 9.9 | 51.9 | 62.8 | 16 |
| ECR-32 (23.0) | 17.9 | 0.7 | 10.9 | 44.1 | 56.0 | 19 |
| ECR-32 (51.2) | 13.8 | 0.8 | 14.9 | 27.6 | 43.4 | 34 |
| ECR-32 (66.2) | 7.4 | 1.1 | 12.0 | 10.1 | 23.2 | 52 |
| ECR-32 (94.5) | 3.5 | 0.8 | 6.7 | 3.2 | 11.0 | 61 |
| ECR-32 (132) | 3.4 | 1.1 | 9.3 | — | 10.4 | 90 |

TABLE 4-continued

| 0.9 wt. % Ir Catalysts (Si/Al ratio) | % Conv | C1–C$_6$[b] | Ring Opening[c] | Ring Contraction[d] | TOTAL | % Ring Opening |
|---|---|---|---|---|---|---|
| ECR-32 (199) | 3.4 | 1.5 | 8.8 | — | 10.5 | 84 |
| USY (37) | 4.1 | 0.4 | 3.6 | 8.8 | 12.9 | 28 |

Methylcyclohexane Reaction Rates (mole/hr/kg catalyst)[a]

[a]Reaction Conditions: WHW = 30, H$_2$/MCH = 5, 400 psig, 260° C.
[b]Includes all hydrocarbons from methane to the molecular weight of hexane.
[c]Includes 2-methylhexane, 3-methylhexane, n-heptane, 2,3-dimethylpentane, 3,3-dimethylpentane, 2,2-dimethylpentane, 2,4-dimethylpentane.
[d]Includes ethylcyclopentane, 1,1-dimethylcyclopentane, 1,2-dimethylcyclopentane and 1,3-dimethylcyclopentane.

EXAMPLE 8

This example demonstrates the flexibility, convenience and robustness of the methods of this invention for the preparation of high silica materials. A sample of ECR-32 was made using a previously reported seeding method (U.S. Pat. No. 45,549,881, Example 19) and a 10% seeded gel composition identical to that for Example 1, resulting in a product having an Si/Al ratio of 5 after 10 days crystallization. After calcining to remove the TPA template and ammonium exchanging to reduce the sodium level. Two 10 gm. batches were placed in a steam oven set at 650° C. One sample was removed after 20 minutes and the second sample was removed after 90 minutes. Each sample was then divided into four parts and refluxed for three hours with 6-ml. 0.1N, 0.25N, 0.5N and 1.0N HCl. Samples were then filtered, washed chloride free, dried at 110° C., then equilibrated overnight over saturated CaCl$_2$ solution. All samples were greater than 70% crystalline. Unit cell measurements and chemical analyses (ICP-AES) were then carried out and presented in Table 5 below, showing a systematic removal of aluminum atoms from the structure as functions of steaming and acid treatment severity. There is surprisingly little difference between the products of short and long steam treatments, indicating the greater efficiency of the short steaming process.

TABLE 5

| Steam Time | Acid Concentration | Unit Cell | Si/Al |
|---|---|---|---|
| 20 minutes | 0.1N | 24.343Å | 8.4 |
| 20 minutes | 0.25 | 24.336Å | 13.0 |
| 20 minutes | 0.50 | 24.293Å | 34.2 |
| 20 minutes | 1.0 | 24.254Å | 79.3 |
| 90 minutes | 0.1N | 24.323Å | 9.1 |
| 90 minutes | 0.25 | 24.314Å | 14.2 |
| 90 minutes | 0.50 | 24.292Å | 53.1 |
| 90 minutes | 1.0 | 24.273Å | 92.4 |

EXAMPLE 9

This example demonstrates the desirability of using a preferred higher Si/Al directly synthesized starting material. To demonstrate this differentiation we used a very high severity steam treatment at 760° C. (1400° F.) for 5 yours. ECR-32 samples having Si/Al ratios of 4.73 and 4.39 were first purged of template and ammonium exchanged as described in Example 1, then placed in a tubular furnace at 760° C. with water saturated flowing air, for five hours. Their crystallinities using the standard ASTM method were 78% and 63% respectively, demonstrating the preference for higher ratio starting materials.

What is claimed is:

1. A method for preparing a faujasite zeolite composition having the formula expressed as the mole ratio of oxides as:

A$_2$O:M$_2$O$_3$:xSiO$_2$ wherein M is a metal selected from Al, Ga, Fe, Cr, Zn, B, and P; A is a cation from Groups I through VIII of the Periodic Table of the Elements and x is between 16 and infinity, which method consists essentially of:

cation exchanging an as synthesized faujasite material having an Si/M greater than 4, with a component selected from the group consisting of ammonium ions and mineral acids;

steam calcining said cation exchanged faujasite in a single steam calcination step at a temperature from about 900° F. to about 1500° F.; and extracting at least a portion of said metal in single extraction step;

wherein the heating rate employed in said calcining is at least 3° C. per minute.

2. The method of claim 1 wherein the faujasitic material is ECR-4 or ECR-32.

3. The method of claim 1 wherein the faujasitic material is ECR-30.

4. The method of claim 1 wherein the faujasitic material is ECR-35.

5. The method of claim 1 wherein the faujasitic material is ZSM-20.

6. The method of claim 1 wherein the product Si/Al is between about 40 and 400.

7. The method of claim 6 wherein the product Si/Al is between about 60 and 200.

8. The method of claim 1 wherein a second catalytic function is provided by incorporating into said faujasite zeolite composition from about 0.01 wt % to about 10 wt % of a metal from Group VIII of the Periodic Table of Elements, which weight percents are based on the total weight of the material.

9. The method of claim 8 wherein the Group VIII metal is a noble metal.

10. The method of claim 9 wherein the Group VIII metal is selected from Pt, Pd, Ir, Ru, and mixtures thereof.

11. The method of claim 10 wherein the metal is Pt, Pd, or mixtures thereof.

12. The method of claim 10 wherein the metal is Ir, Ru, or mixtures thereof.

13. The method of claim 1 wherein the as synthesized faujasite material has an Si/M greater than about 4.5.

14. The method of claim 1 wherein the as synthesized faujasite material has an Si/M greater than about 5.

* * * * *